June 26, 1962 S. A. BOETTCHER ETAL 3,040,770
VALVE
Filed June 22, 1959
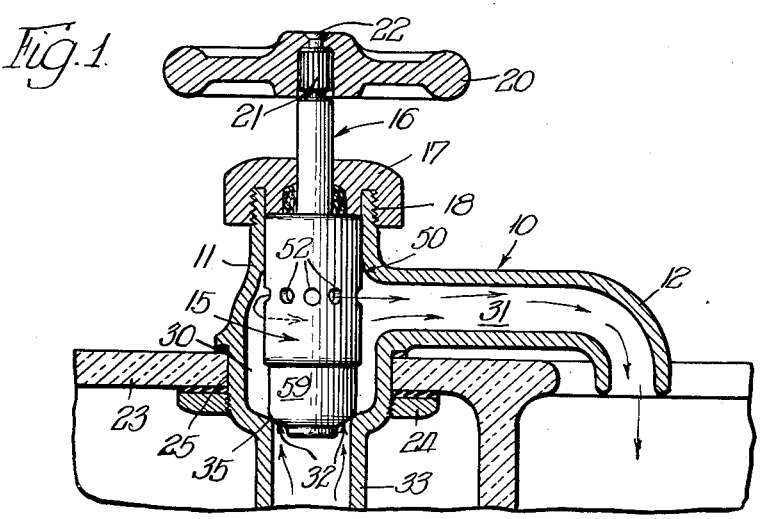
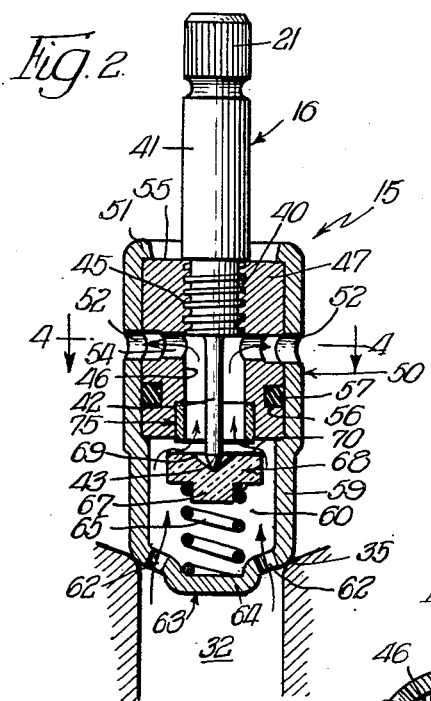
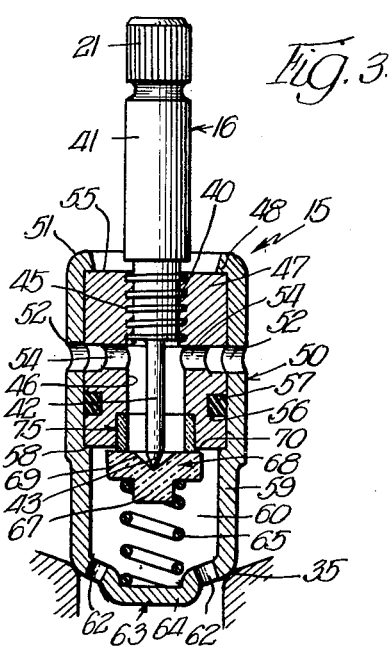
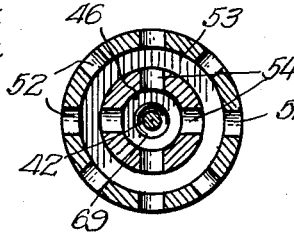
Inventors:
Stephen A. Boettcher,
and Jack C. Page,
BY

United States Patent Office 3,040,770
Patented June 26, 1962

3,040,770
VALVE
Stephen A. Boettcher, Evanston, and Jack C. Page, Palatine, Ill., assignors to Speedlap Corporation, Skokie, Ill., a corporation of Illinois
Filed June 22, 1959, Ser. No. 822,098
2 Claims. (Cl. 137—454.6)

Our present invention relates, in general, to valves, and particularly to shut-off valves for controlling the flow of fluids through pipe lines, and the like.

Valves, as employed for hot and cold water faucets, sill cocks, and like installations generally embody removable seat washers and are particularly weak in their ability to effectively stop the flow of liquids with repeated operation over an extended period of time. The familiar problem of repairing leaky faucets by replacing bib washers is well known, particularly to the home owner.

The present invention is generally directed to improvements in such faucet valves and is concerned especially with an improved valve arrangement in which ceramic or non-corrosive metals are employed to effect improved life and wearability. Certain of our improvements concern a valve system in which a valve body is closed with and by fluid pressure, while being opened in response to the positive action of an operating stem means that applies lifting force to the low pressure side of a valve disc body.

Since previous valve systems employing ceramic valve seats and bodies have been particularly vexed by the problem of pointed or concentrated loading of the ceramic members, such leading to the untimely destruction of the ceramic, the arrangement and construction employed in the present invention seeks studiously to avoid such problem during both opening and closing operations of the valve. In this respect, opening or unseating forces applied to the valve body are workable between limits beyond which the valve body is freely movable. This avoids overloading of the valve body on opening. Conversely, closing movement of the valve body is substantially independent of the means employed for opening the same and depends almost entirely on fluid pressure. In brief, the improved valve of this invention includes a threaded operating stem movable between limits through an annular valve seat member to engage a valve disc or body member. Such valve disc member is preferably piloted centrally of an annular seat member to open against a guiding spring means and the pressure of fluid controlled by the valve. Opening movement of the operating means fails to reach the limit of the movement permitted for the valve body, thereby concentrated loading of the latter member by opening activity of the operating means is avoided. The valve closes upon reverse movement of the operating means and under the influence of the pressurized fluid; there being no positive mechanical or other means requiring the closing activity of the body member other than the pressure of the fluid involved.

The main object of this invention is to provide a new and improved valve means for controlling the flow of fluid.

A further object of this invention is to provide a new and improved valve means, as aforesaid, which is so constructed and arranged as to avoid application of concentrated loads on a movable valve body.

A still further object of this invention is to provide a new and improved valve means employing valve seat and body means of a hard vitreous material in which the valve means is lifted by force applied to its low pressure side and closed under and with the fluid pressure applied to the high pressure side thereof.

A still additional object of this invention is to provide a new and improved valve assembly for particular use in controlling the flow of liquids which is economical to manufacture, simple to operate, and demonstrates improved operating wearability and life.

The above and further objects, features, and advantages of this invention will be recognized by those familiar with the art from the following detailed description of a preferred embodiment of our invention, as such appears in the appended drawings.

In the drawings:

FIGURE 1 is a cross-sectional view taken substantially along the longitudinal center line of a typical sink faucet in which the improved valve assembly of this invention may be employed as illustrated, such view having parts thereof in side elevation.

FIGURE 2 is an enlarged sectional view, with parts thereof shown in full side elevation of an improved valve assembly, according to this invention; such demonstrating the operating elements as they appear with the valve in an open operating position;

FIGURE 3 is a cross-sectional view, similar to FIGURE 2, demonstrating the improved valve of this invention in a closed operating condition; and FIGURE 4 is a cross-sectional view taken substantially at line 4—4 of FIGURE 2 and looking in the direction of the arrows thereon.

Turning now to the features of the invention as shown in the embodiment of the drawings, it will be appreciated that FIGURE 1 demonstrates a typical faucet assembly 10, including a cast metal housing 11, a spigot 12, and an internal valve assembly or unit 15, according to this invention.

Assembly 15 includes an operating stem 16 threadingly movable through a stuffing box and closure cap 17 engaging external threads 18 at the upper end of the housing 11. A manually engageable handle means 20 is fitted over fluted lands and grooves 21 at the outer end of the operating stem 16 and is held thereto by screw means 22 in a recognized manner.

Housing 11 is suitably secured to an under-supporting platform 23, such as a countertop, porcelain sink, or the like, by a nut member 24 threadingly engaged with housing 11 and compressing a seal washer 25 against the support 23, all in a well recognized manner.

The housing 11 is, as stated, hollowed to receive the valve assembly 15 and for such purpose defines an internal valve chamber 30 which communicates at one end with a discharge passageway 31 of the spigot 12. The other end of chamber 30 joins an inlet passageway 32 defined by an inlet portion 33 adapted for connection with a supply pipe line, or the like.

As will be recognized from FIGURE 1, in particular, with valve assembly 15 located properly in chamber 30, the lower end thereof tightly seats against an internal annular shoulder portion 35 provided in the valve housing substantially at the junction between chambers 30 and inlet 32. In this respect, the valve assembly 15 is of a suitable diameter and length, so that tightening of the closure cap 17 effectively seats the same against shoulder 35 to prevent the flow or passage of fluid therebetween (see FIGURE 2).

Turning now to the particulars of the improved valve assembly 15 of this invention, reference is made to FIGURES 2, 3, and 4 of the drawings. Assembly 15 includes the valve operating stem 16 which bears a conventional operating thread portion 40 adjacent a cylindrical body portion 41. An elongated stem portion 42 of reduced diameter extends axially beyond the thread portion 40 and includes a pointed lower end 43.

The threaded portion 40 engages mating threads 45 formed in a central axial bore 46 of an operating body 47, which is preferably formed of brass, stainless steel, or like non-corrosive materials. The operating body 47 fits snugly within a cartridge sleeve 50 which is open at its upper end and suitably spun over at 48 to hold body 47 in place. Sleeve 50 also includes a plurality of discharge ports or openings 52 in its side walls which communicate directly with an annular passageway 53 formed in operating body 47. Additional passageways 54 in the body 47 communicate between the annular passageway 53 and the central axial bore 46 (see FIGURE 4).

An upper end wall 55 of the body member 47 acts as a stop barrier to limit inward axial movement of the stem member 16 by engaging a shoulder formed at the lower end of stem portion 41. The operating body 47 is also provided with an annular recess 56 below the discharge ports 53, 54 to accommodate an annular O-ring 57 which engages the internal side walls of the sleeve member 50 and provides a seal therewith.

Sleeve member 50 is suitably indented at a point intermediate its ends to present an annular shoulder 58 in support of the lower end of the operating body 47 and to provide an inlet chamber section 59 definitive of a substantially cylindrical chamber 60 beneath body 47. Inlet ports or openings 62 enter a bottom wall 63 of the casing 50 and particularly communicate with the chamber 60 for the passage of fluid from the supply inlet chamber 32. Bottom wall 63 is further distinguished by a central depressed area 64 definitive of a substantially cylindrical cup which acts as a pilot receptacle for the lower end of a compression coil spring 65 mounted within chamber 60 and adapted to receive, within its upper end, a centrally disposed depending neck extension 67 of a movable valve disc 68.

Valve disc 68 may constitute stainless steel, brass, or preferably a suitable ceramic or vitreous material of recognized characteristics and properties suitable for this purpose. For example, various ceramic materials having a high degree of wearability, hardness, and resistance to corrosion are available commercially. Typical of these are the high alumina compositions which demonstrate high mechanical strength and shock resistance. In any event, such valve disc is distinguished by a conical depression 69 formed centrally of its upper face for reception of the pointed pilot end 43 of the operating stem 16.

The movable valve disc 68 cooperates with a substantially annular valve seat 75 press fitted into the lower end of the central axial bore 46 in the operating body 47; such also preferably constituting a stainless steel, ceramic, or other vitreous materials. Desirably, the material selected for valve seat 75, either metal or ceramic, is somewhat softer than that used for the valve disc 68, so that any errosion or wear between the two members will result in first wearing away the outer annular end of the valve seat 75, instead of forming a groove in the seating face of the valve disc 68, which would likely cause the valve to leak. In order to form proper sealing engagement between the valve seat 75 and the seating face of the valve disc 68, the opposing faces of such two members are finely lapped.

With particular regard to FIGURE 3 of the drawings, it will be understood that when stem 16 is backed off sufficiently by reverse threading action, the movable valve disc 68 seats, with the pressure of the fluid, against the lower axial end of the annular valve seat 75. Thus, the opposing lapped faces of such two members contact. In this position also, the spring 65 is substantially free of any compressive load. It is fully intended, in this respect, that the final closing movements of valve member 68 occur freely under the influence of the pressurized fluid within chamber 60 and substantially independently of pressure by the spring means 65.

It will also be noticed that the central depression 69 of the valve disc 68 cooperates fully with the pointed lower end 43 of the stem 42 to permit complete interfacial engagement between the valve disc and the valve seat.

By threading stem 16 inwardly toward the operating body 47, the lower end of the stem's body portion 41 eventually engages the upper face 55 of the body 47, whereby the valve disc 68 is unseated and moved away from the valve seat 75 against the pressure of fluid within the chamber 60. When this limit position is achieved, the valve is fully opened and the valve disk 68 is held between the stem end 43 and the spring 65. It is also to be noted that the extending neck portion 67 of the movable valve member 68 is held in the open upper end of the spring means 65 and is thereby guided with the spring means substantially coaxially of chamber 60. The force of spring 65 is intentionally maintained at a value sufficient only to retain the unseated valve disc 68 in engagement with the lower pointed end 43 of the operating stem 42 and is not used as a seating force for closing the valve.

It will be recognized, therefore, that the improved valve assembly 15 of this invention includes a valve preferably having a ceramic-to-ceramic shut-off sealing in which a movable member is manually unseated against the force of pressurized fluid, the flow of which is controlled by the valve. Conversely, such movable valve member 68 seats with the fluid pressure. So long as the intermating faces of the two members 68 and 75 are kept free of foreign material, such faces will produce a good seal of a remarkable life span for valve assembly 10. It is also to be noted that, as the valve disk 68 approaches the seat 75, the decreased spacing between such two members serves to effectively throttle the flow of pressurized liquid into bore 46, increasing the velocity in fluid flow between the two ceramic members to effectively clean their interfacial areas and maintain the valve seat free of foreign material.

From the foregoing, it is believed that those familiar with the art will recognize and appreciate the improvements which mark the present invention as an advancement over prior art valves of this general category. Further, it will be appreciated that while we have herein shown and described the features and aspects of our invention as it appears in conjunction with a preferred embodiment shown in the drawings and hereinabove described, nevertheless numerous changes, modifications, and substitutions of equivalents may be made therein without necessarily departing from the spirit and scope of our invention. Consequently, it is intended that we be limited in the scope of our invention only as appears in the following appended claims.

We claim:

1. In a valve assembly for interrupting the flow of pressurized fluid, a threadingly movable operating stem, annular valve seat means coaxial of said stem and through which one end of the latter is movable, a valve disc adjacent said seat means, said seat means and valve disc having opposed annular faces for interfacial seating engagement, pilot means on said valve disc coaxially engaged with the said one end of said operating stem for piloting said valve disc into coaxial alignment with said seat means, and spring means operable, when compressed, to resiliently support said valve disc and maintain the said pilot means in piloting engagement with said operating stem's one end; said spring means being compressed by movement of said valve disc theretoward, against the pressure of the fluid to be controlled by the assembly, and beyond a preselected limit of unseating movement away from said seat means in response to threading operation of said stem, and said valve disc being movable from said preselected limit toward and against said seat means solely by the influence of the pressure of the fluid being controlled and unthreading operation of said stem, said seat means and valve disc being formed of hard vitreous materials, and stop means limiting movement of said operating stem toward said valve disc to prevent overloading of the latter.

2. A valve comprising a hollow body member having fluid inlet and outlet means for the passage of pressurized fluid therethrough, a substantially cylindrical casing mounted in said body and having sealing engagement therewith, said casing having fluid inlet means at one end and outlet means adjacent its other end, an operating valve body encased by said housing, an operating stem threadingly supported in said operating body and movable coaxially therethrough, said operating stem being movable through a central passageway of said operating body, an annular seat member at one end of said passageway, a valve disc adjacent said seat member and responsively movable with said stem, compression spring means located between said disc and the inlet means of said casing, said valve disc having a free floating connection with said valve stem and said spring means and being freely movable independently of said spring means between one end of the latter and said seat member by and with the pressure of said fluid and unthreading movement of said stem, and pilot means for maintaining said valve disc coaxially of said stem and spring and operable under the influence of the latter when said disc is moved beyond a preselected limit away from said seat member to compressively load said spring, said valve disc being moved away from said seat member with the threading movement of said stem, said valve disc and seat member being of a vitreous material, and means for limiting the threading movement of said operating stem toward said valve disc in order to prevent the positive overloading of the latter by threading operation of said stem.

References Cited in the file of this patent

UNITED STATES PATENTS

| | | |
|---|---|---|
| 475,728 | Giffard | May 24, 1892 |
| 1,762,178 | Lear | June 10, 1930 |
| 2,595,671 | Greene | May 6, 1952 |
| 2,631,893 | Cartwright | Mar. 17, 1953 |
| 2,840,102 | Richter | June 24, 1958 |

FOREIGN PATENTS

| | | |
|---|---|---|
| 1,138,164 | France | Jan. 21, 1957 |